US011941727B2

(12) United States Patent
Motiian et al.

(10) Patent No.: US 11,941,727 B2
(45) Date of Patent: Mar. 26, 2024

(54) SYSTEMS AND METHODS FOR FACIAL IMAGE GENERATION

(71) Applicant: ADOBE INC., San Jose, CA (US)

(72) Inventors: Saeid Motiian, San Francisco, CA (US); Wei-An Lin, San Jose, CA (US); Shabnam Ghadar, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 14 days.

(21) Appl. No.: 17/813,987

(22) Filed: Jul. 21, 2022

(65) Prior Publication Data
US 2024/0037805 A1 Feb. 1, 2024

(51) Int. Cl.
G06T 11/00 (2006.01)
G06V 40/16 (2022.01)

(52) U.S. Cl.
CPC ............ *G06T 11/00* (2013.01); *G06V 40/168* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 11,631,208 B1* | 4/2023 | Khirman | G06N 3/088 382/100 |
| 2019/0019063 A1* | 1/2019 | Prokopenya | G06N 3/047 |
| 2020/0294294 A1* | 9/2020 | Petriv | G06N 3/08 |
| 2022/0222539 A1* | 7/2022 | Klein | G06N 3/088 |
| 2022/0391611 A1* | 12/2022 | Kalarot | G06N 3/09 |
| 2023/0072759 A1* | 3/2023 | Zhang | G06T 11/60 |
| 2023/0081982 A1* | 3/2023 | He | G06V 10/751 382/157 |

(Continued)

OTHER PUBLICATIONS

Daniel Sáez Trigueros, Li Meng, Margaret Hartnett, "Generating photo-realistic training data to improve face recognition accuracy", 2020, Neural Networks, 134:86-94 (Year: 2020).*

(Continued)

*Primary Examiner* — Michael J Cobb
(74) *Attorney, Agent, or Firm* — F. CHAU & ASSOCIATES, LLC

(57) ABSTRACT

Systems and methods for facial image generation are described. One aspect of the systems and methods includes receiving an image depicting a face, wherein the face has an identity non-related attribute and a first identity-related attribute; encoding the image to obtain an identity non-related attribute vector in an identity non-related attribute vector space, wherein the identity non-related attribute vector represents the identity non-related attribute; selecting an identity-related vector from an identity-related vector space, wherein the identity-related vector represents a second identity-related attribute different from the first identity-related attribute; generating a modified latent vector in a latent vector space based on the identity non-related attribute vector and the identity-related vector; and generating a modified image based on the modified latent vector, wherein the modified image depicts a face that has the identity non-related attribute and the second identity-related attribute.

20 Claims, 12 Drawing Sheets

(56) References Cited

U.S. PATENT DOCUMENTS

| | | | |
|---|---|---|---|
| 2023/0086807 A1* | 3/2023 | Lukác | G06T 7/11 |
| | | | 345/629 |
| 2023/0245351 A1* | 8/2023 | Cao | G06T 11/001 |
| | | | 345/629 |
| 2023/0252627 A1* | 8/2023 | Khirman | G06V 10/46 |
| | | | 382/128 |
| 2023/0252687 A1* | 8/2023 | Zhang | G06N 3/08 |
| | | | 382/159 |
| 2023/0377213 A1* | 11/2023 | Naruniec | G06V 10/82 |

OTHER PUBLICATIONS

Goodfellow, et al., "Generative Adversarial Nets", arXiv preprint arXiv:1406.2661v1 [stat.ML] Jun. 10, 2014, 9 pages.

Karras, et al., "A Style-Based Generator Architecture for Generative Adversarial Networks", arXiv preprint arXiv:1812.04948v3 [cs.NE] Mar. 29, 2019, 12 pages.

Karras, et al., "Analyzing and Improving the Image Quality of StyleGAN", arXiv preprint rXiv:1912.04958v2 [cs.CV] Mar. 23, 2020, 21 pages.

Khodadadeh, et al., "Latent to Latent: A Learned Mapper for Identity Preserving Editing of Multiple Face Attributes in StyleGAN-generated images", in 2022 IEEE/CVF Winter Conference on Applications of Computer Vision (WACV), Jan. 2022, pp. 3184-3192, 9 pages.

Kingma and Welling, "Auto-Encoding Variational Bayes", arXiv preprint arXiv:1312.6114v10 [stat.ML] May 1, 2014, 14 pages.

Nitzan, et al., "LARGE: Latent-Based Regression through GAN Semantics", arXiv preprint arXiv:2107.11186v1 [cs.CV] Jul. 22, 2021, 30 pages.

Radford, et al., "Learning Transferable Visual Models from Natural Language Supervision", arXiv preprint arXiv:2103.00020v1 [cs.CV] Feb. 26, 2021, 48 pages.

Shen, et al., "InterFaceGAN: Interpreting the Disentangled Face Representation Learned by GANs", arXiv preprint arXiv:2005.09635v2 [cs.CV] Oct. 29, 2020, 16 pages.

Tov, et al., "Designing an Encoder for StyleGAN Image Manipulation", arXiv preprint arXiv:2102.02766v1 [cs.CV] Feb. 4, 2021, 33 pages.

Xia, et al., "GAN Inversion: A Survey", arXiv preprint arXiv:2101.05278v5 [cs.CV] Mar. 22, 2022, 17 pages.

\* cited by examiner

SYSTEMS AND METHODS FOR FACIAL IMAGE GENERATION

BACKGROUND

The following relates to facial image generation. Facial image generation refers to an automated or semi-automated creation of an image depicting a human face based on input data. Facial image generation is useful for tasks in which the use of images that depict faces of actual people is undesirable or cumbersome, such as creating a large corpus of facial images having desired characteristics for training a machine learning model.

Conventional facial image generation techniques can generate a new face based on an original face such that an identity of the original face is propagated to the new face, and a non-identifying characteristic of the original face, such as hair color, is changed in the new face. However, conventional facial image generation techniques do not generate a new face based on an original face such that a non-identifying characteristic of the original face is propagated to the new face while an identity of the new face is changed from an identity of the original face. There is therefore a need in the art for facial image generation systems and methods that generate a modified image that retains a non-identifying characteristic of an original image while including an identity-related characteristic that is omitted in the original image.

SUMMARY

Embodiments of the present disclosure provide facial image generation systems and methods that propagate a non-identifying characteristic (e.g., a hair style) of an original facial image to a modified facial image while including an identity-related characteristic in the modified image that is omitted in the original facial image. An example of an identity-related characteristic is eye size. According to some aspects, a machine learning model encodes a vector representation of a non identity-related attribute of the original image and generates a modified latent vector in a latent space based on the vector representation of the non identity-related attribute and a vector representation of an identity-related attribute that is not included in the original image. By generating the modified image based on the modified latent vector, the modified image depicts a face that has the identity non-related attribute and the identity-related attribute that is omitted from the original image.

A method, apparatus, non-transitory computer readable medium, and system for facial image generation are described. One or more aspects of the method, apparatus, non-transitory computer readable medium, and system include receiving an image depicting a face, wherein the face has an identity non-related attribute and a first identity-related attribute; encoding the image to obtain an identity non-related attribute vector in an identity non-related attribute vector space, wherein the identity non-related attribute vector represents the identity non-related attribute; selecting an identity-related vector from an identity-related vector space, wherein the identity-related vector represents a second identity-related attribute different from the first identity-related attribute; generating a modified latent vector in a latent vector space based on the identity non-related attribute vector and the identity-related vector; and generating a modified image based on the modified latent vector, wherein the modified image depicts a face that has the identity non-related attribute and the second identity-related attribute.

A method, apparatus, non-transitory computer readable medium, and system for facial image generation are described. One or more aspects of the method, apparatus, non-transitory computer readable medium, and system include identifying an identity non-related attribute vector representing an identity non-related attribute of a face; identifying a latent vector for an image generation network; encoding the latent vector using an encoder of a mapping network to obtain an identity-related vector on an identity-related vector space; generating a modified latent vector based on the identity non-related attribute vector and the identity-related vector using a decoder of the mapping network; and updating parameters of the mapping network based on the identity non-related attribute vector, the latent vector, and the modified latent vector.

An apparatus and system for facial image generation are described. One or more aspects of the apparatus and system include a processor; a memory storing instructions executable by the processor; an attribute encoder configured to encode an image to obtain an identity non-related attribute vector in an identity non-related attribute vector space, wherein the identity non-related attribute vector represents an identity non-related attribute of the image; a selection component configured to select an identity-related vector from an identity-related vector space, wherein the identity-related vector represents a second identity-related attribute different from a first identity-related attribute of the image; a mapping network configured to generate a modified latent vector in a latent vector space based on the identity non-related attribute vector and the identity-related vector; and an image generation network configured to generate a modified image based on the modified latent vector.

DETAILED DESCRIPTION

The present disclosure relates to facial image generation. Facial image generation refers to an automated or semi-automated creation of an image depicting a human face based on input data. Facial image generation is useful for tasks in which the use of images that depict the faces of actual people is undesirable or cumbersome, such as creating a large corpus of facial images having desired characteristics for training a machine learning model.

Conventional facial image generation techniques can generate a new face based on an original face such that an identity of the original face is propagated to the new face, and a non-identifying characteristic of the original face, such as hair color, is changed in the new face. However, conventional facial image generation techniques do not generate a new face based on an original face such that a non-identifying characteristic of the original face is propagated to the new face while an identity of the new face is changed from an identity of the original face.

According to some embodiments of the present disclosure, a system receives an image depicting a face. The face has an identity non-related attribute and a first identity-related attribute. The system uses a machine learning model to encode the image to obtain an identity non-related attribute vector in an identity non-related attribute vector space. The identity non-related attribute vector represents the identity non-related attribute. The machine learning model selects an identity-related vector from an identity-related vector space. The identity-related vector represents a second identity-related attribute different from the first identity-related attribute. The machine learning model generates a modified latent vector in a latent vector space based on the identity non-related attribute vector and the identity-related vector, and generates a modified image based on the modified latent vector. The modified image depicts a face that has the identity non-related attribute and the second identity-related attribute.

An embodiment of the present disclosure is used in a facial image generation context. In an example, a user provides a facial image to the system. The facial image may depict a face that has an identity non-related attribute (such as a hair color, a hair style, eye glasses, etc.) that the user wants to replicate in an image that depicts a face having a modified identity. In response to receiving the facial image, the system generates a modified image based on the image, an identity non-related attribute vector, and an identity-related vector, and provides the modified image to the user. Therefore, according to some aspects, the user may use the system to quickly generate a set of facial images depicting different identities that share a same identity non-related attribute.

Figure 1:
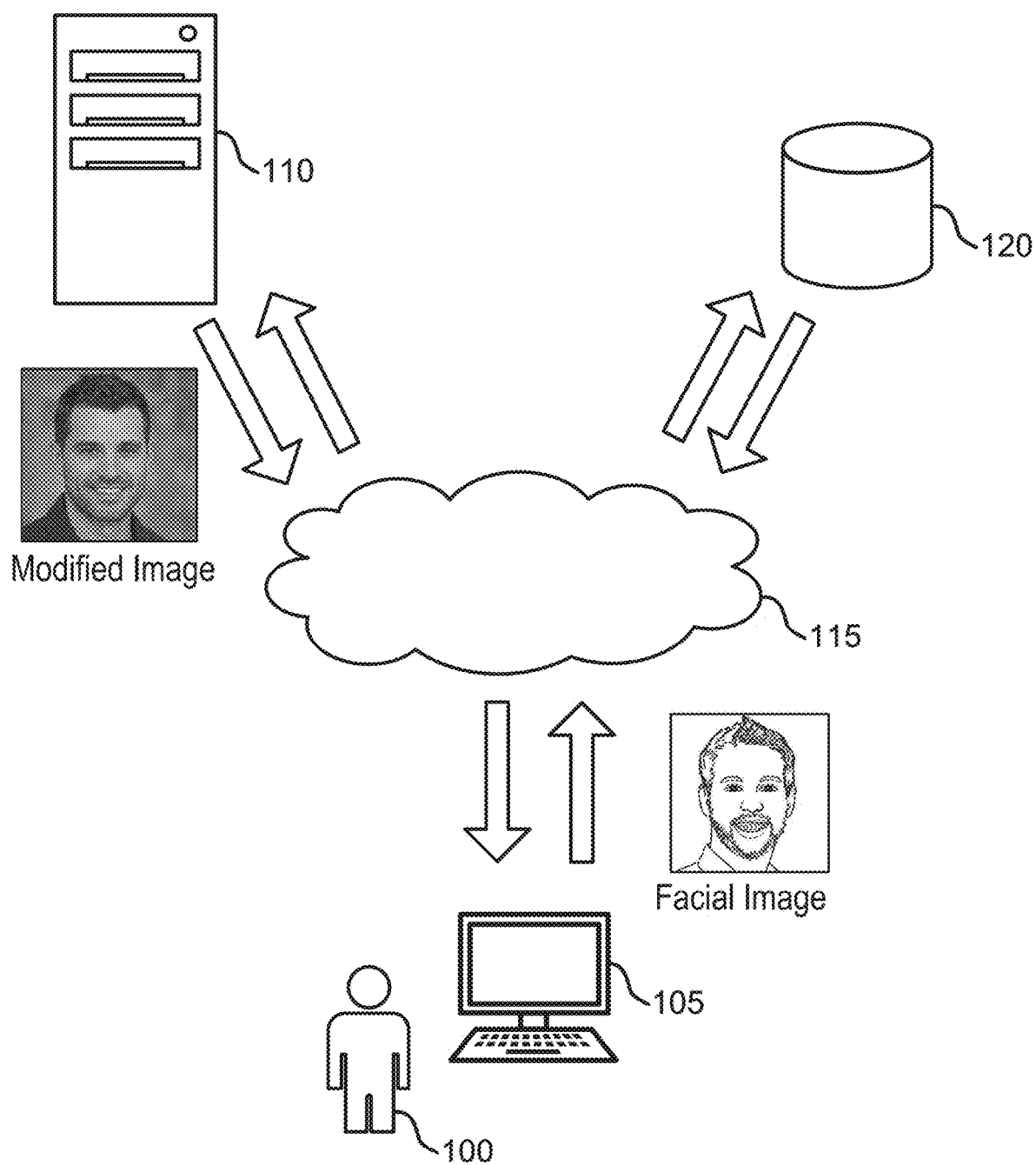
FIG. 1 shows an example of a facial image generation system according to aspects of the present disclosure.
Figure 4:
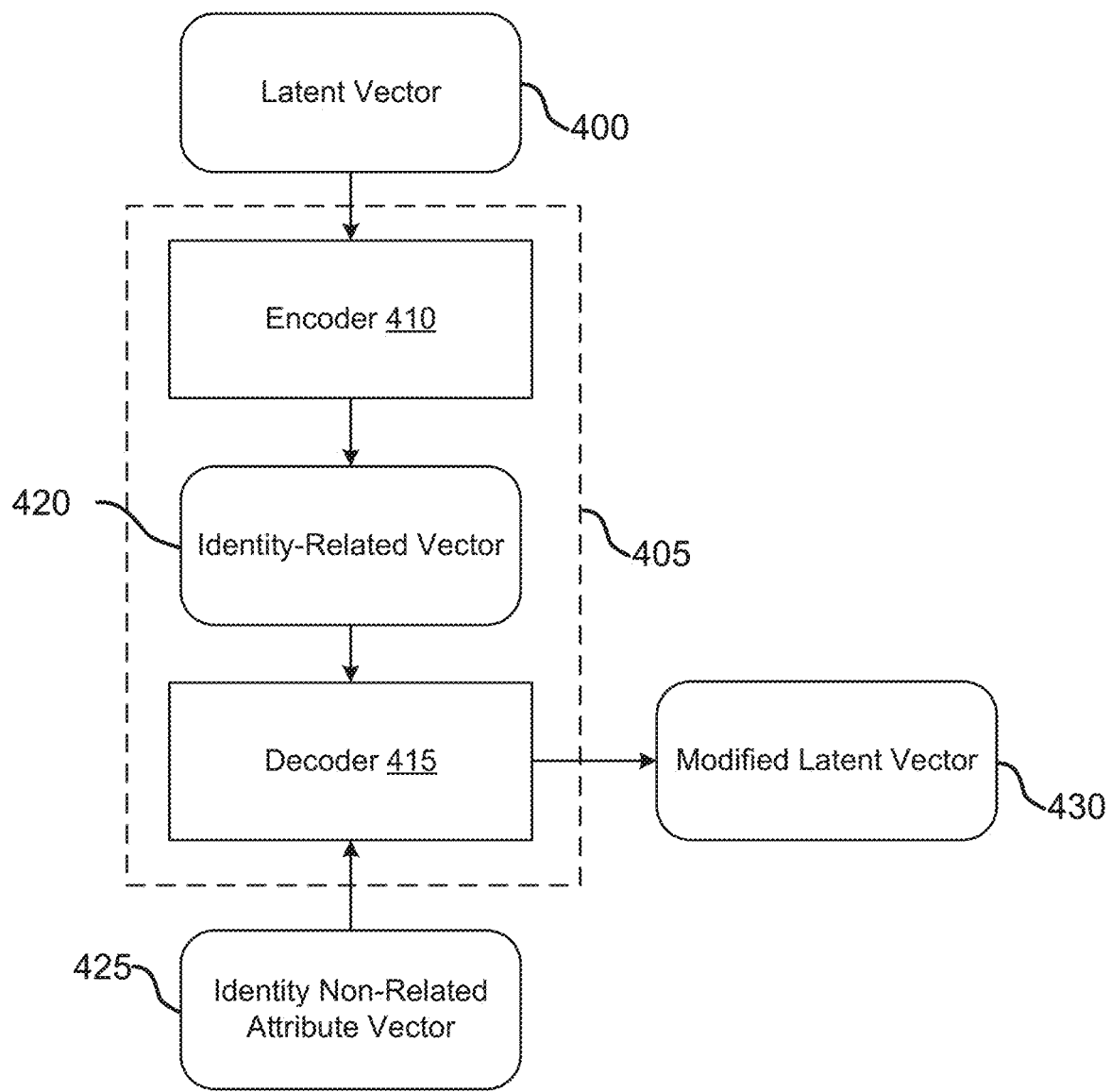
FIG. 4 shows an example of a data flow in a mapping network according to aspects of the present disclosure.
Figure 5:
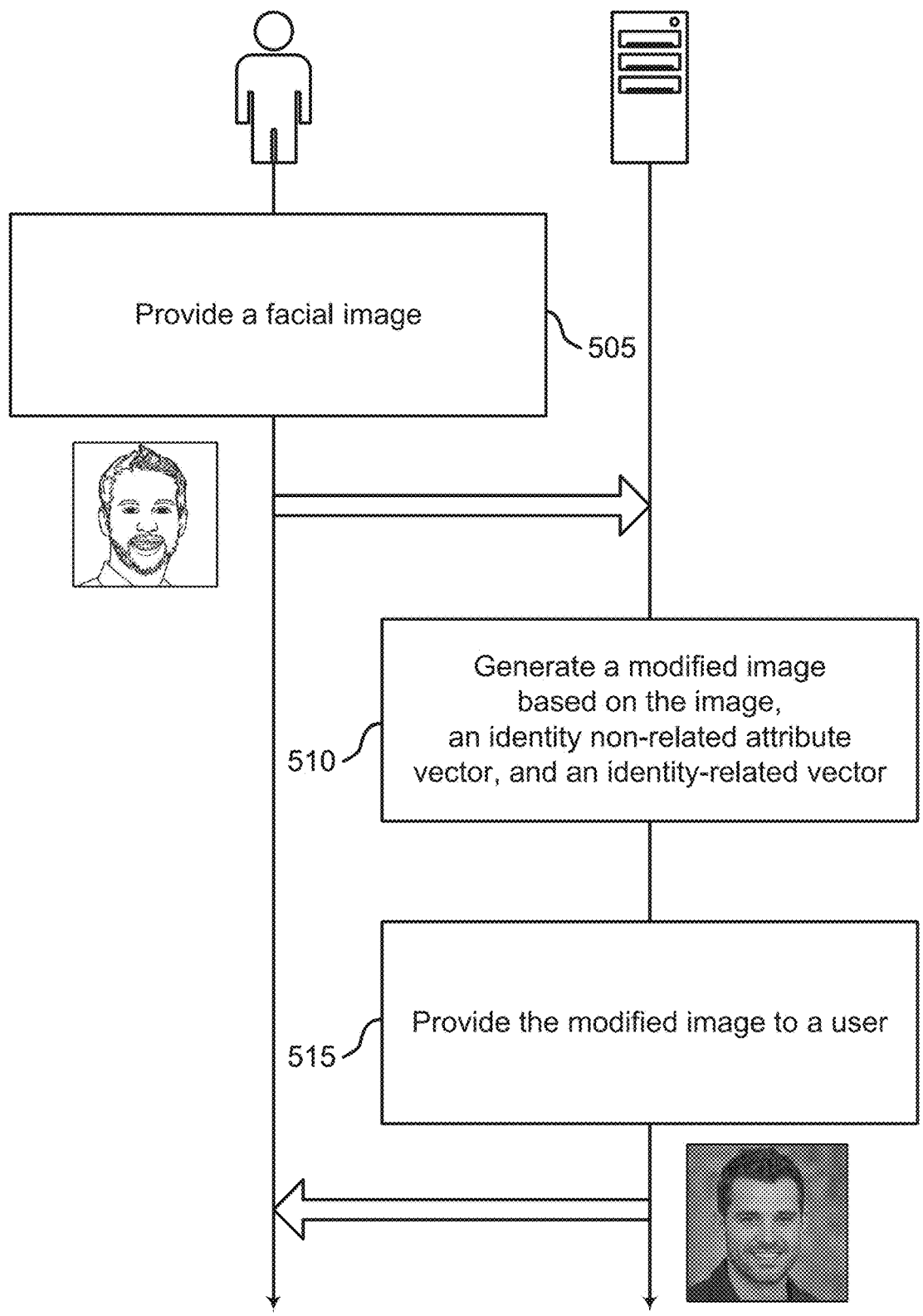
FIG. 5 shows an example of facial image generation according to aspects of the present disclosure.

Example applications of the present disclosure in the facial image generation context are provided with reference to FIGS. 1 and 5. Details regarding the architecture of the system are provided with reference to FIGS. 1-4. Examples of a process for facial image generation are provided with reference to FIGS. 5-8. Examples of a process for training the machine learning model are provided with reference to FIGS. 9-12.

Facial Image Generation System

A system and apparatus for facial image generation is described with reference to FIGS. 1-4. One or more aspects of the system and apparatus include a processor; a memory storing instructions executable by the processor; an attribute encoder configured to encode an image to obtain an identity non-related attribute vector in an identity non-related attribute vector space, wherein the identity non-related attribute vector represents an identity non-related attribute of the image; a selection component configured to select an identity-related vector from an identity-related vector space, wherein the identity-related vector represents a second identity-related attribute different from a first identity-related attribute of the image; a mapping network configured to generate a modified latent vector in a latent vector space based on the identity non-related attribute vector and the identity-related vector; and an image generation network configured to generate a modified image based on the modified latent vector.

In some aspects, the mapping network comprises an encoder that is trained to take vectors from the latent vector space and output a Gaussian distribution of vectors in the identity-related vector space. In some aspects, the mapping network comprises a decoder configure to generate the modified latent vector.

In some aspects, the attribute encoder comprises a multi-modal encoder. In some aspects, the image generation network comprises a generative adversarial network (GAN). Some examples of the system and apparatus further include a user interface configured to receive a blending input from a user, wherein the modified image is generated based on the blending input.

FIG. 1 shows an example of a facial image generation system according to aspects of the present disclosure. The example shown includes user 100, user device 105, facial image generation apparatus 110, cloud 115, and database 120. Facial image generation apparatus 110 is an example of, or includes aspects of, the corresponding element described with reference to FIG. 2.

Referring to FIG. 1, user 100 provides a facial image to facial image generation apparatus via user device 105 and cloud 115. In some embodiments, the facial image includes an identity non-related attribute (for example, a hair color) and a first identity-related attribute (for example, a cheekbone structure). Facial image generation apparatus 110 generates a modified image in response to receiving the facial image. In some embodiments, the modified image depicts a face having the identity non-related attribute and a second identity-related attribute different from the first identity-related attribute (for example, a different cheekbone structure). In some embodiments, facial image generation apparatus 110 displays the modified image to user 100 via user device 105.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by facial image generation apparatus 110. In some aspects, the graphical user interface allows user 100 to upload or otherwise transfer a file including an image to facial image generation apparatus 110. In some aspects, the graphical user interface displays images to user 100.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, facial image generation apparatus 110 includes a computer implemented network. In some embodiments, the computer implemented network includes a machine learning model. In some embodiments, facial image generation apparatus 110 also includes one or more processors, a memory subsystem, a communication interface, an I/O interface, one or more user interface components, and a bus. Additionally, in some embodiments, facial image generation apparatus 110 communicates with user device 105 and database 120 via cloud 115.

In some cases, facial image generation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

Figure 2:
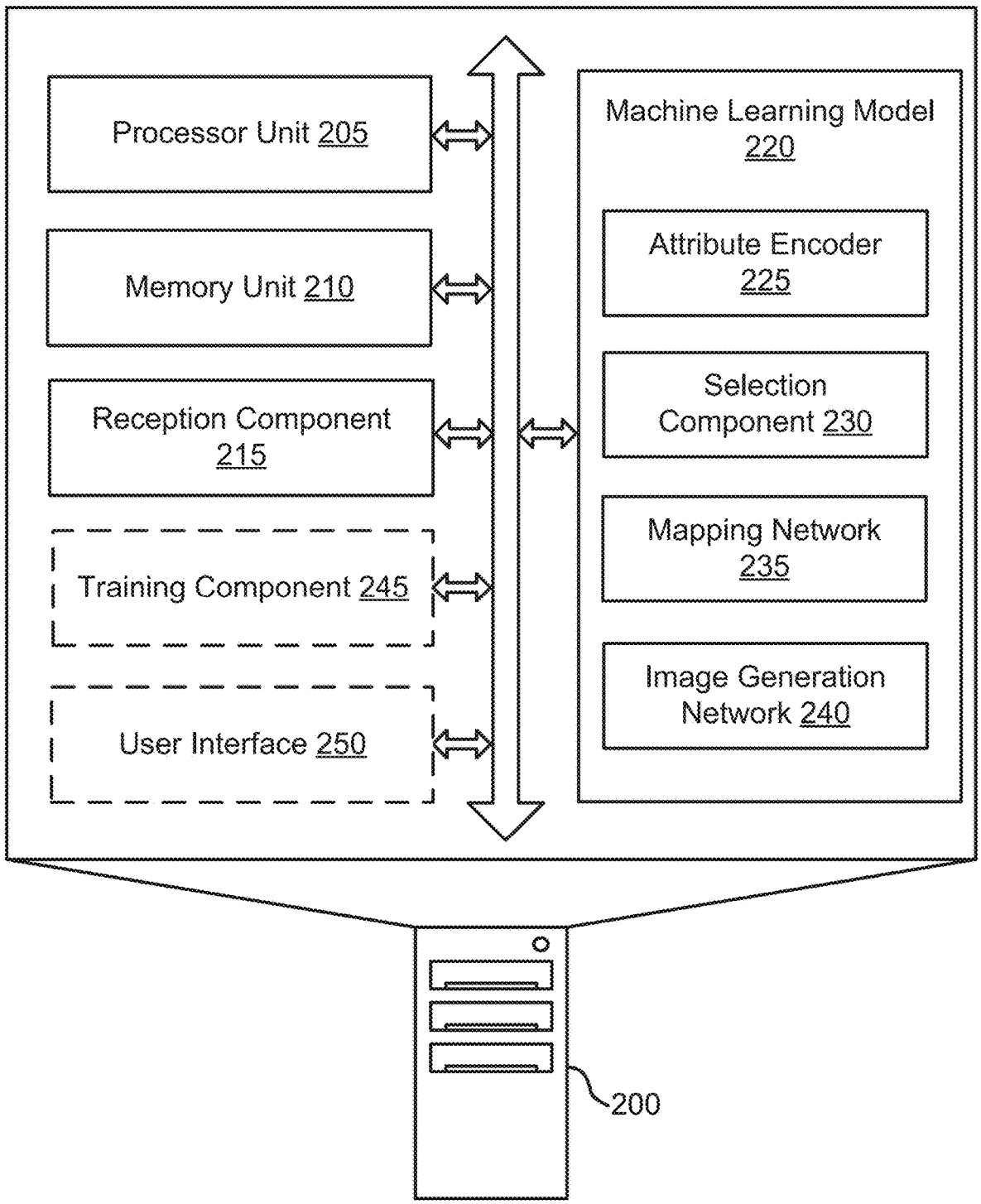
FIG. 2 shows an example of a facial image generation apparatus according to aspects of the present disclosure.
Figure 3:
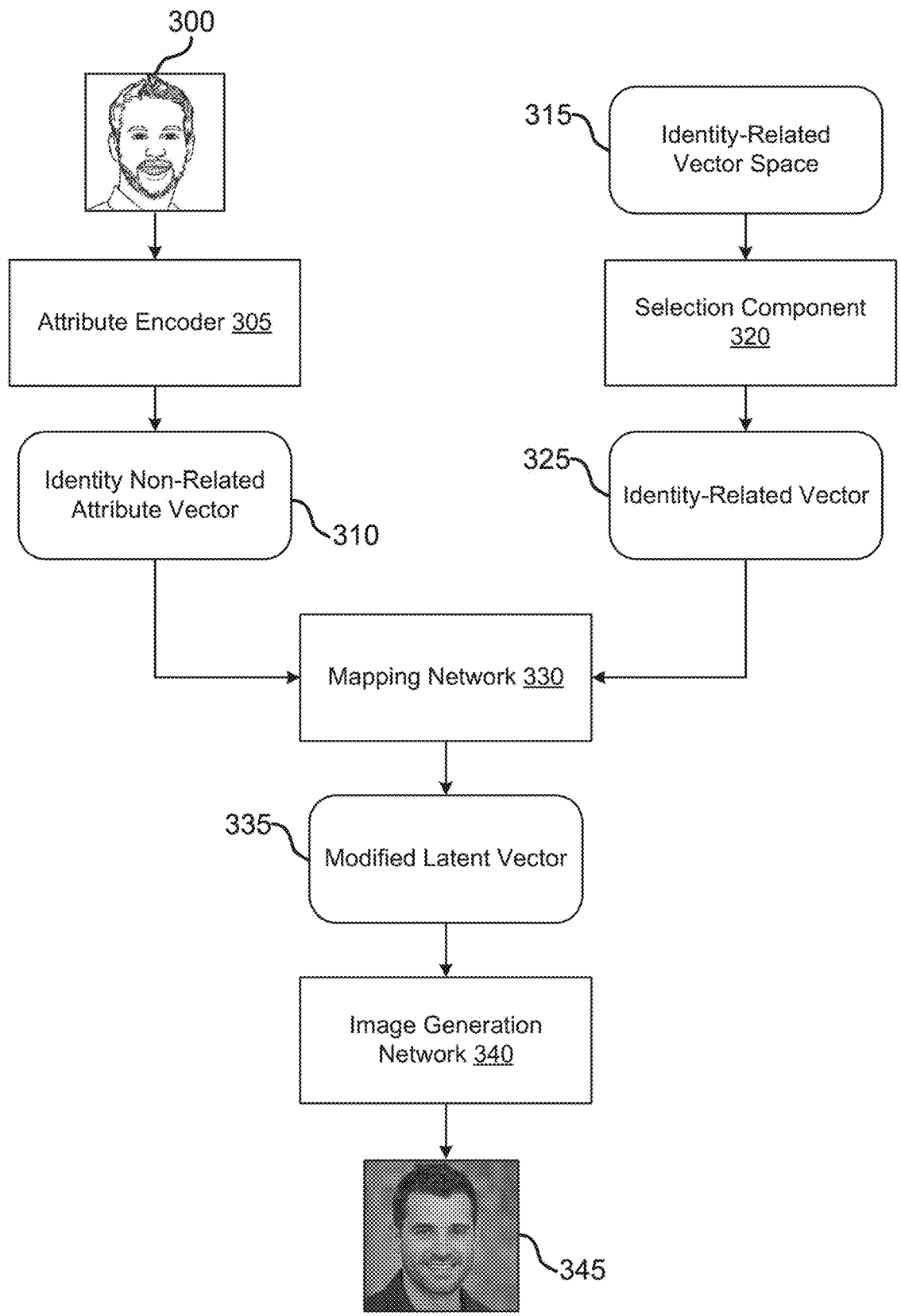
FIG. 3 shows an example of data flow in a machine learning model according to aspects of the present disclosure.

Further detail regarding the architecture of facial image generation apparatus 110 is provided with reference to FIGS. 2-4. Further detail regarding a process for facial image generation is provided with reference to FIGS. 5-8. Further detail regarding a process for training the machine learning model is provided with reference to FIGS. 9-12.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, facial image generation apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, facial image generation apparatus 110 retrieves the facial image from database 120 in response to a user input to the user interface. According to some aspects, database 120 stores outputs of various components of facial image generation apparatus 110, such as latent vectors, identity-related attribute vectors, identity non-related attribute vectors, combined input vectors, modified latent vectors, and modified images. In some aspects, database 120 is external to facial image generation apparatus 110 and communicates with facial image generation apparatus 110 via cloud 115. In some embodiments, database 120 is included in facial image generation apparatus 110.

FIG. 2 shows an example of a facial image generation apparatus according to aspects of the present disclosure. Facial image generation apparatus 200 is an example of, or includes aspects of, the corresponding element described with reference to FIG. 1. In one aspect, facial image generation apparatus 200 includes processor unit 205, memory unit 210, reception component 215, machine learning model 220, training component 245, and user interface 250.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. For example, according to some aspects, memory unit 210 stores components of facial image generation apparatus 200 that are implemented as software. In some cases, memory unit 210 includes a basic input/output system (B IOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, reception component 215 receives an image depicting a face, where the face has an identity non-related attribute and a first identity-related attribute. According to some aspects, reception component 215 is implemented as one or more hardware circuits, as firmware, as software stored in memory unit 210 and executed by processor unit 205, or as a combination thereof.

According to some aspects, machine learning model 220 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. In some embodiments, a block includes one or more layers. Different layers perform different transformations on their inputs. The initial layer is known as the input layer and the last layer is known as the output layer. In some cases, signals traverse certain layers multiple times.

According to some aspects, machine learning model 220 is implemented as one or more hardware circuits, as firmware, as software stored in memory unit 210 and executed by processor unit 205, or as a combination thereof. In one aspect, machine learning model 220 includes attribute encoder 225, selection component 230, mapping network 235, and image generation network 240. According to some aspects, each of attribute encoder 225, selection component 230, mapping network 235, and image generation network 240 includes one or more ANNs.

According to some aspects, attribute encoder 225 encodes the image to obtain an identity non-related attribute vector in an identity non-related attribute vector space, where the identity non-related attribute vector represents the identity non-related attribute. In some examples, attribute encoder 225 detects a set of identity non-related attributes of the face to obtain a set of identity non-related attribute values representing the set of identity non-related attributes, respectively, where the identity non-related attribute vector includes the set of identity non-related attribute values. In some aspects, the image is encoded using a multi-modal encoder.

According to some aspects, attribute encoder 225 encodes the image to obtain the identity non-related attribute vector. In some examples, attribute encoder 225 encodes the additional image to obtain an additional identity non-related attribute vector.

According to some aspects, attribute encoder 225 is configured to encode an image to obtain an identity non-related attribute vector in an identity non-related attribute vector space, wherein the identity non-related attribute vector represents an identity non-related attribute of the image.

In some aspects, the attribute encoder 225 includes a multi-modal encoder. A multi-modal encoder is an encoder that can process input from multiple modalities (for example, from images and text). In some embodiments, attribute encoder 225 is implemented according to a Contrastive Language-Image Pre-Training (CLIP) architecture.

CLIP is an ANN that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

According to some aspects, attribute encoder 225 is implemented as a feature extractor. In an image processing context, a feature extractor uses various algorithms to detect and isolate various desired portions or shapes of an input image or video. In addition, the feature extractor recognizes and extracts features. In some embodiments, attribute encoder 225 encodes the isolated portions of the image as vectors.

Attribute encoder 225 is an example of, or includes aspects of, the corresponding element described with reference to FIG. 3. According to some aspects, attribute encoder 225 is implemented as software stored in memory unit 210 and executed by processor unit 205, as firmware, as one or more hardware circuits, or as a combination thereof.

According to some aspects, selection component 230 selects an identity-related vector from an identity-related vector space, where the identity-related vector represents a second identity-related attribute different from the first identity-related attribute. In some aspects, the identity-related vector is selected randomly from the identity-related vector space. In some examples, selection component 230 selects a set of identity-related vectors from the identity-related vector space, where each of the set of identity-related vectors corresponds to a different identity-related attribute. In some examples, selection component 230 selects an additional identity-related vector independent of the additional latent vector.

According to some aspects, selection component 230 identifies a latent vector representing the image. In some examples, selection component 230 provides the latent vector to a first block of an image generation network 240. In some examples, selection component 230 selects the second block of image generation network 240 for providing the modified latent vector based on the blending parameter.

According to some aspects, selection component 230 identifies a set of data pairs, where each of the set of data pairs includes an image of a set of images and a corresponding latent vector from a set of latent vectors, where the latent vector is selected from a data pair of the set of data pairs.

According to some aspects, selection component 230 is configured to select an identity-related vector from an identity-related vector space, wherein the identity-related vector represents a second identity-related attribute different from a first identity-related attribute of the image. Selection component 230 is an example of, or includes aspects of, the corresponding element described with reference to FIG. 3.

According to some aspects, selection component 230 is implemented as software stored in memory unit 210 and executed by processor unit 205, as firmware, as one or more hardware circuits, or as a combination thereof.

According to some aspects, mapping network 235 generates a modified latent vector in a latent vector space based on the identity non-related attribute vector and the identity-related vector. In some examples, mapping network 235 concatenates the identity non-related attribute vector and the identity-related vector to obtain a combined input vector, where the modified latent vector is generated based on the combined input vector. In some examples, mapping network 235 generates a set of modified latent vectors based on the set of identity-related vectors and the identity non-related attribute vector.

In some examples, mapping network 235 provides the modified latent vector to a second block of the image generation network 240, where the modified image is generated based on the latent vector and the modified latent vector using the image generation network 240.

According to some aspects, mapping network 235 identifies an identity non-related attribute vector representing an identity non-related attribute of a face. In some examples, mapping network 235 identifies a latent vector for an image generation network 240. In some examples, mapping network 235 encodes the latent vector using an encoder of a mapping network 235 to obtain an identity-related vector on an identity-related vector space. In some examples, mapping network 235 generates a modified latent vector based on the identity non-related attribute vector and the identity-related vector using a decoder of the mapping network 235. In some examples, mapping network 235 generates an additional modified latent vector based on the identity-related vector, the additional identity-related vector, and the additional identity non-related attribute vector. In some examples, mapping network 235 generates a set of additional identity-related vectors.

According to some aspects, mapping network 235 is configured to generate a modified latent vector in a latent vector space based on the identity non-related attribute vector and the identity-related vector. In some aspects, the mapping network 235 includes an encoder that is trained to take vectors from the latent vector space and output a Gaussian distribution of vectors in the identity-related vector space. In some aspects, the mapping network 235 includes a decoder configured to generate the modified latent vector.

According to some aspects, mapping network 235 is implemented as a variational autoencoder (VAE). An autoencoder is a type of ANN used to learn efficient data encoding in an unsupervised manner. The aim of an autoencoder is to learn a representation (encoding) for a set of data, such as for dimensionality reduction, by training the network to ignore signal "noise". Along with the reduction side, a reconstructing side may also be learned. The reconstructing network tries to generate, from the reduced encoding, a representation as close as possible to the original input. Several variants exist to the basic model, with the aim of forcing the learned representations of the input to assume useful properties. Examples include regularized autoencoders (Sparse, Denoising and Contractive autoencoders), which can be effective in learning representations for subsequent classification tasks, and variational autoencoders (VAEs), which may be useful as generative models. In some cases, VAE's operate by making assumptions concerning the distribution of latent variables. The variational approach for latent representation learning may result in an additional loss component and a specific estimator for the training algorithm called the Stochastic Gradient Variational Bayes (SGVB) estimator.

Mapping network 235 is an example of, or includes aspects of, the corresponding element described with reference to FIGS. 3 and 4. According to some aspects, mapping network 235 is implemented as software stored in memory unit 210 and executed by processor unit 205, as firmware, as one or more hardware circuits, or as a combination thereof.

According to some aspects, image generation network 240 generates a modified image based on the modified latent vector, where the modified image depicts a face that has the identity non-related attribute and the second identity-related attribute. In some examples, image generation network 240 generates a set of modified images based on the set of modified latent vectors.

According to some aspects, image generation network 240 generates an image based on the latent vector. In some examples, image generation network 240 generates an additional image based on an additional latent vector. In some examples, image generation network 240 identifies a set of latent vectors in a latent space. In some examples, image generation network 240 generates a set of images based on the set of latent vectors, respectively.

According to some aspects, image generation network 240 is configured to generate a modified image based on the modified latent vector. In some aspects, the image generation network 240 includes a generative adversarial network (GAN). A GAN is a category of ANN in which two neural networks are trained based on a contest with each other. Given a training set, the network learns to generate new data with similar properties as the training set. For example, a GAN trained on photographs can generate new images that look authentic to a human observer.

GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

According to some aspects, the GAN is implemented according to a StyleGAN architecture. In some embodiments, the StyleGAN architecture includes a synthesis network including a set of layers, where each layer of the set of layers performs a convolution operation and an Adaptive instance normalization on an input, and an output layer of the synthesis network uses a convolution function to output an RGB image.

According to some aspects, image generation network 240 includes a first block and a second block. According to some aspects, each of the first block and the second block includes one or more ANN layers. Image generation network 240 is an example of, or includes aspects of, the corresponding element described with reference to FIG. 3. According to some aspects, image generation network 240 is implemented as software stored in memory unit 210 and executed by processor unit 205, as firmware, as one or more hardware circuits, or as a combination thereof.

According to some aspects, training component 245 updates parameters of the mapping network 235 based on the identity non-related attribute vector, the latent vector, and the modified latent vector. In some examples, training component 245 computes a reconstruction loss based on the latent vector and the modified latent vector, where the parameters of the mapping network 235 are updated based on the reconstruction loss. In some examples, training component 245 computes an attribute loss based on the additional latent vector and the additional modified latent vector, where the parameters of the mapping network 235 are updated based on the attribute loss.

In some examples, training component 245 computes a divergence loss based on the set of additional identity-related vectors, where the parameters of the mapping network 235 are updated based on the divergence loss. In some aspects, the divergence loss causes the encoder to output a Gaussian distribution.

According to some aspects, training component 245 is implemented as software stored in memory unit 210 and executed by processor unit 205, as firmware, as one or more hardware circuits, or as a combination thereof. In some cases, training component 245 is omitted from facial image generation apparatus 200 and is included in a device that is external to facial image generation apparatus 200. In this case, the external device performs a training process for facial image generation apparatus 200 described with reference to FIGS. 9-12 using training component 245.

According to some aspects, user interface 250 receives a user input indicating a blending parameter. According to some aspects, user interface 250 is configured to receive a blending input from a user, wherein the modified image is generated based on the blending input.

According to some aspects, user interface 250 is displayed via a display included in facial image generation apparatus 200. According to some aspects, user interface 250 is displayed on a user device as described with reference to FIG. 1 by facial image generation apparatus 200. According to some aspects, user interface 250 is implemented as software.

FIG. 3 shows an example of data flow in a machine learning model according to aspects of the present disclosure. The example shown includes facial image 300, attribute encoder 305, identity non-related attribute vector 310, identity-related vector space 315, selection component 320, identity-related vector 325, mapping network 330, modified latent vector 335, image generation network 340, and modified image 345.

Attribute encoder 305 is an example of, or includes aspects of, the corresponding element described with reference to FIG. 2. Selection component 320 is an example of, or includes aspects of, the corresponding element described with reference to FIG. 2. Mapping network 330 is an example of, or includes aspects of, the corresponding element described with reference to FIGS. 2 and 4. Image generation network 340 is an example of, or includes aspects of, the corresponding element described with reference to FIG. 2.

Identity non-related attribute vector 310 is an example of, or includes aspects of, the corresponding element described with reference to FIG. 4. Identity-related vector 325 is an example of, or includes aspects of, the corresponding element described with reference to FIG. 4. Modified latent vector 335 is an example of, or includes aspects of, the corresponding element described with reference to FIG. 4.

In an example shown by FIG. 3, attribute encoder 305 receives image 300 from a reception component as described with reference to FIG. 2. In some embodiments, image 300 depicts a face that has an identity non-related attribute and a first identity-related attribute. Attribute encoder 305 encodes image 300 to obtain identity non-related attribute vector 310 as described with reference to FIG. 6. Attribute encoder 305 provides identity non-related attribute vector 310 to mapping network 330.

Selection component 320 selects identity-related vector 325 corresponding to a second identity-related attribute from identity-related vector space 315 as described with reference to FIG. 6. Selection component 320 provides identity-related vector 325 to mapping network 330.

Mapping network 330 decodes identity non-related attribute vector 310 and identity-related vector 325 to obtain modified latent vector 335 as described with reference to FIG. 6. Mapping network 330 provides modified latent vector 335 to image generation network 340.

Image generation network 340 generates modified image 345 by decoding modified latent vector 335 as described with reference to FIG. 6. According to some aspects, modified image 345 therefore depicts a face having the identity non-related attribute corresponding to identity non-related attribute vector 310 and the second identity-related attribute corresponding to identity-related vector 325.

FIG. 4 shows an example of data flow in a mapping network according to aspects of the present disclosure. The example shown includes latent vector 400, mapping network 405, identity-related vector 420, identity non-related attribute vector 425, and modified latent vector 430.

Mapping network 405 is an example of, or includes aspects of, the corresponding element described with reference to FIGS. 2 and 3. In one aspect, mapping network 405 includes encoder 410 and decoder 415.

Identity-related vector 420 is an example of, or includes aspects of, the corresponding element described with reference to FIG. 3. Identity non-related attribute vector 425 is an example of, or includes aspects of, the corresponding element described with reference to FIG. 3. Modified latent vector 430 is an example of, or includes aspects of, the corresponding element described with reference to FIG. 3.

Referring to FIG. 4, encoder 410 receives latent vector 400 and encodes latent vector 400 to obtain identity-related vector 420 as described with reference to FIG. 9. Decoder 415 receives and decodes identity non-related attribute vector 425 and identity-related vector 420 to obtain modified latent vector 430 as described with reference to FIG. 9.

Facial Image Generation

A method for facial image generation is described with reference to FIGS. 5-8. One or more aspects of the method include receiving an image depicting a face, wherein the face has an identity non-related attribute and a first identity-related attribute; encoding the image to obtain an identity non-related attribute vector in an identity non-related attribute vector space, wherein the identity non-related attribute vector represents the identity non-related attribute; selecting an identity-related vector from an identity-related vector space, wherein the identity-related vector represents a second identity-related attribute different from the first identity-related attribute; generating a modified latent vector in a latent vector space based on the identity non-related attribute vector and the identity-related vector; and generating a modified image based on the modified latent vector, wherein the modified image depicts a face that has the identity non-related attribute and the second identity-related attribute.

Some examples of the method further include detecting a plurality of identity non-related attributes of the face to obtain a plurality of identity non-related attribute values representing the plurality of identity non-related attributes, respectively, wherein the identity non-related attribute vector includes the plurality of identity non-related attribute values. In some aspects, the image is encoded using a multi-modal encoder. In some aspects, the identity-related vector is selected randomly from the identity-related vector space.

Some examples of the method further include concatenating the identity non-related attribute vector and the identity-related vector to obtain a combined input vector, wherein the modified latent vector is generated based on the combined input vector.

Some examples of the method further include selecting a plurality of identity-related vectors from the identity-related vector space, wherein each of the plurality of identity-related vectors corresponds to a different identity-related attribute. Some examples further include generating a plurality of modified latent vectors based on the plurality of identity-related vectors and the identity non-related attribute vector. Some examples further include generating a plurality of modified images based on the plurality of modified latent vectors.

Some examples of the method further include identifying a latent vector representing the image. Some examples further include providing the latent vector to a first block of an image generation network. Some examples further include providing the modified latent vector to a second block of the image generation network, wherein the modified image is generated based on the latent vector and the modified latent vector using the image generation network.

Some examples of the method further include receiving a user input indicating a blending parameter. Some examples further include selecting the second block of the image generation network for providing the modified latent vector based on the blending parameter.

FIG. 5 shows an example of facial image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, some embodiments of the present disclosure are used in a facial image generation context. In an example, a user provides a facial image to the system. The facial image may depict a face that has an identity non-related attribute (for example, glasses) that the user wants to replicate in an image that depicts a face having a modified identity (as shown by an identity-related attribute such as a nose shape). In response to receiving the facial image, the system generates a modified image based on the image, an identity non-related attribute vector, and an identity-related vector, and provides the modified image to the user. Therefore, according to some aspects, the user may use the system to quickly generate a set of facial images depicting different identities that share a same identity non-related attribute.

At operation 505, a user as described with reference to FIG. 1 provides a facial image. In an example, the user uploads the facial image to the system via a user interface to a reception component as described with reference to FIG. 2. In some examples, the user interface is displayed by the system via a user device as described with reference to FIG. 1. In some embodiments, the facial image depicts a face having an identity non-related attribute and a first identity-related attribute.

At operation 510, the system generates a modified image based on the image, an identity non-related attribute vector of the image, and an identity-related vector. In some cases, the operations of this step refer to, or may be performed by, a facial image generation apparatus as described with reference to FIGS. 1 and 2. In an example, the facial image generation apparatus generates the modified image as described with reference to FIG. 6. In some embodiments, the modified image depicts a face having the identity non-related attribute and a second identity-related attribute different from the first identity-related attribute.

At operation 515, the system provides the modified image to a user. In some cases, the operations of this step refer to, or may be performed by, a facial image generation apparatus as described with reference to FIGS. 1 and 2. In an example, the facial image generation apparatus displays the modified image via the user interface and offers an ability for the user to download or otherwise transfer a file including the modified image to the user device or to another device.

Figure 6:
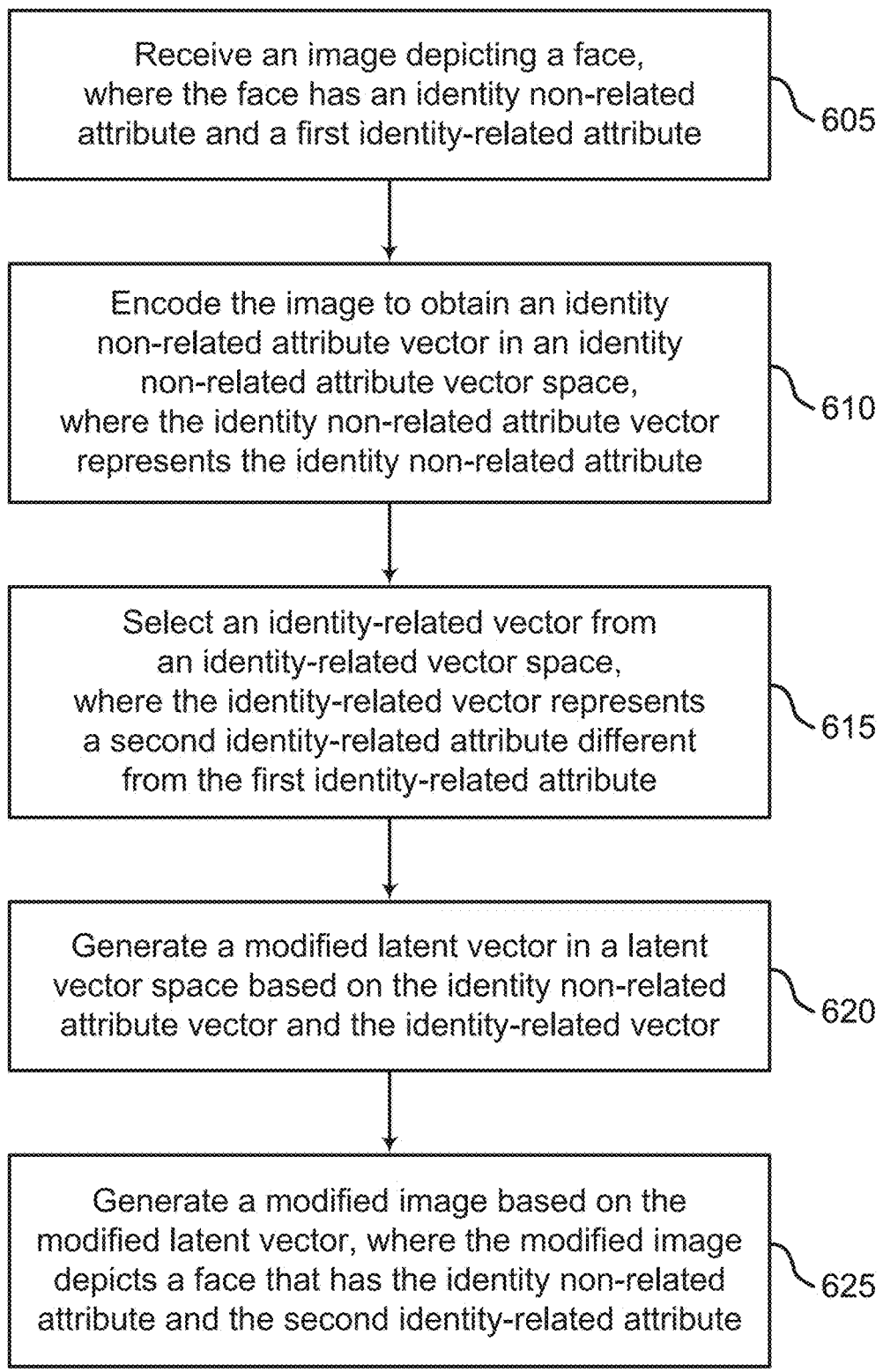
FIG. 6 shows an example of generating a modified image according to aspects of the present disclosure.

FIG. 6 shows an example of generating a modified image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system receives an image depicting a first face as input and generates a modified image depicting a second face in response to receiving the image. In some embodiments, the first face has an identity-related attribute and an identity non-related attribute, and the second face has the identity non-related attribute and a different identity-related attribute. In some embodiments, the system generates a set of modified images having the identity non-related attribute and a set of identity-related attributes.

At operation 605, the system receives an image depicting a face, where the face has an identity non-related attribute and a first identity-related attribute. In some cases, the operations of this step refer to, or may be performed by, a reception component as described with reference to FIG. 2.

According to some aspects, a user provides the image to the reception component via a user interface as described with reference to FIG. 2. In an example, the user uploads a computer file including the image to the reception component via the user interface. According to some aspects, the reception component retrieves the image from a database as described with reference to FIG. 2. According to some aspects, the reception component retrieves the image from an online data source, such as a webpage.

According to some aspects, an identity non-related attribute is an attribute of a face such as a hair color, a lip color, a hair style, makeup, accessories, clothing, and glasses that may be altered without changing the apparent "identity" of a person having the attribute. For example, given a pair of images depicting a same initial face in which a hair style of the initial face is altered in the second image, a typical observer would perceive that the pair of images depict an identical person having a changed hair style in the second image.

According to some aspects, an identity-related attribute is an attribute of a face such as a nose size, a nose shape, a head shape, an eye color, an eye shape, a forehead structure, a cheek structure, a mouth size, a mouth shape, an ear size, and an ear shape that may not be altered without changing the apparent "identity" of a person having the attribute. For example, given a pair of images depicting a same initial face in which an eye shape of the initial face is altered in the second image, a typical observer would perceive that the pair of images depict two different people.

At operation 610, the system encodes the image to obtain an identity non-related attribute vector in an identity non-related attribute vector space, where the identity non-related attribute vector represents the identity non-related attribute. In some cases, the operations of this step refer to, or may be performed by, an attribute encoder as described with reference to FIGS. 2 and 3.

As used herein, a vector space $\mathbb{R}^n$ is a set of n-tuple vectors that may be added and scaled according to properties of the vector space $\mathbb{R}^n$. According to some aspects, the identity non-related attribute vector space is a set of identity non-related attribute vectors. According to some aspects, the attribute encoder obtains the identity-non related attribute vector by encoding the image using a multi-modal encoder. In an example, the multi-modal encoder receives the image from the reception component and generates a vector representation of an identity non-related attribute of the face included in the image.

According to some aspects, the attribute encoder detects a set of identity non-related attributes of the face to obtain a set of identity non-related attribute values representing the set of identity non-related attributes, respectively, where the identity non-related attribute vector includes the plurality of identity non-related attribute values. In an example, the multi-modal encoder generates the set of values representing the set of identity non-related attributes and includes the set of values in the identity non-related attribute vector.

At operation 615, the system selects an identity-related vector from an identity-related vector space, where the identity-related vector represents a second identity-related attribute different from the first identity-related attribute. In some cases, the operations of this step refer to, or may be performed by, a selection component as described with reference to FIGS. 2 and 3.

An illustrative example of a second identity-related attribute that is different from the first identity-related attribute is a second ear shape that is different from a first ear shape. Another illustrative example of a second identity-related attribute that is different from the first identity-related attribute is an ear shape that is different from a forehead shape. According to some aspects, the selection component randomly selects the identity-related vector from the identity-related vector space. In an example, a set of identity-related vectors is stored in a database as described with reference to FIG. 2, and the selection component randomly samples the identity-related vector from the set of identity-related vectors. According to some aspects, a mapping network as described with reference to FIGS. 2-4 obtains the set of identity-related vectors corresponding to the identity-related vector space by encoding a set of latent vectors and stores the set of identity-related vectors in the database.

At operation 620, the system generates a modified latent vector in a latent vector space based on the identity non-related attribute vector and the identity-related vector. In some cases, the operations of this step refer to, or may be performed by, a mapping network as described with reference to FIGS. 2-4.

As used herein, a latent space is a set of values that may be included in latent vectors. In some embodiments, the mapping network concatenates the identity non-related attribute vector and the identity-related vector to obtain a combined input vector, and generates the modified latent vector in the latent vector space by decoding the combined input vector using a decoder of the mapping network.

At operation 625, the system generates a modified image based on the modified latent vector, where the modified image depicts a face that has the identity non-related attribute and the second identity-related attribute. In some cases, the operations of this step refer to, or may be performed by, an image generation network as described with reference to FIGS. 2 and 3.

According to some aspects, the selection component identifies a latent vector representing the image. In some embodiments, the latent vector is a vector in the latent space. In some embodiments, a selection component as described with reference to FIG. 2 generates a set of latent vectors on the latent space. In some embodiments, the selection component retrieves the set of latent vectors from a database as described with reference to FIG. 2. According to some aspects, the selection component selects a latent vector from the set of latent vectors and provides the latent vector to first block of the image generation network. According to some aspects, the mapping network provides the modified latent vector to a second block of the image generation network.

According to some aspects, the image generation network generates a modified image based on the latent vector and the modified latent vector by decoding the latent vector and the modified latent vector. In some embodiments, a user interface as described with reference to FIG. 2 receives a user input indicating a blending parameter, and the selection component selects the second block of the image generation network for providing the modified latent vector based on the blending parameter. As used herein, a blending parameter is a rendering Application Programming Interface (API) parameter that allows a visual attribute or image to be composited over a base image. In some embodiments, the blending parameter is a parameter that receives a value of the image, the latent vector, and the modified latent vector in response to the user input. Furthermore, in some embodiments, in response to the user input, the selection component selects the second block of the image generation network, and instructs the mapping network to provide the modified latent vector to the second block of the image generation network for generating the modified image.

In an example, as the modified latent vector is obtained based on the identity non-related attribute vector and the identity-related vector, the image therefore depicts a face that includes the identity non-related attribute and the second identity-related attribute. As an example, where the image depicts a face having a certain eye shape and a certain hair color, the modified image may depict a face having a different eye shape and the same hair color. According to some aspects, some embodiments of the present disclosure thereby generate a modified image in which an identity non-related attribute of a face is held constant from an original image, while an identity-related attribute of the face is altered. Accordingly, some embodiments of the present disclosure provide an ability for a user to quickly generate one or more modified images depicting various facial identities while holding one or more desired identity non-related attributes constant. An example of generating a set of modified images is described with reference to FIG. 7.

Figure 7:
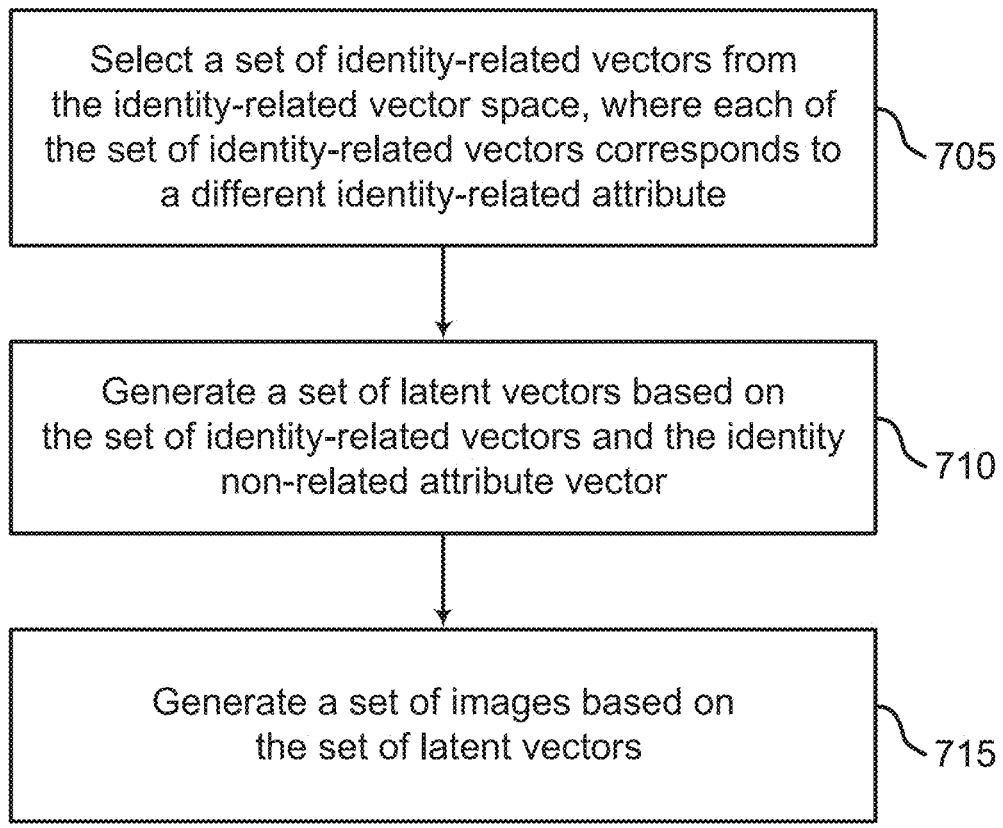
FIG. 7 shows an example of generating a set of images according to aspects of the present disclosure.

FIG. 7 shows an example of generating a set of images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system selects a set of identity-related vectors from the identity-related vector space, where each of the set of identity-related vectors corresponds to a different identity-related attribute. In some cases, the operations of this step refer to, or may be performed by, a selection component as described with reference to FIGS. 2 and 3.

In some embodiments, the selection component selects the set of identity-related vectors from identity-related vectors stored in a database. In some embodiments, the selection component randomly samples the set of identity-related vectors from the identity-related vector space. In some embodiments, each identity-related vector of the set of identity-related vectors is a numerical representation of an identity-related attribute. In some embodiments, the identity-related vector space has a Gaussian distribution.

At operation 710, the system generates a set of modified latent vectors based on the set of identity-related vectors and the identity non-related attribute vector. In some cases, the operations of this step refer to, or may be performed by, a mapping network as described with reference to FIGS. 2-4. In an example, the selection component provides the set of identity-related vectors to the mapping network, and the mapping network separately concatenates the identity non-related attribute vector with each identity-related vector of the set of identity-related vectors to obtain a set of combined input vectors. The mapping network then decodes the set of combined input vectors using the decoder of the mapping network to obtain the set of modified latent vectors.

At operation 715, the system generates a set of modified images based on the set of modified latent vectors. In some cases, the operations of this step refer to, or may be performed by, an image generation network as described with reference to FIGS. 2 and 3. In an example, the image generation network decodes the set of modified latent vectors to obtain the set of modified images in a similar manner as described with reference to FIG. 6. According to some aspects, each modified image of the set of modified images depicts a face that has the identity non-related attribute and an identity-related attribute corresponding to the respective modified latent vector. An example of a set of modified images is described with reference to FIG. 8.

Figure 8:
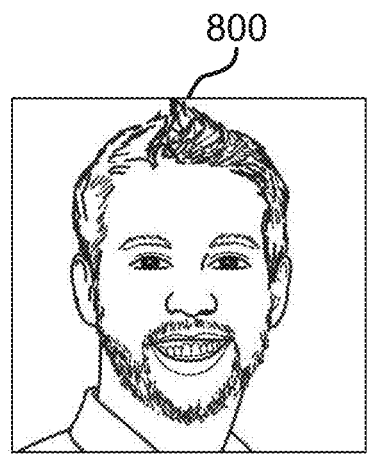
FIG. 8 shows an example of modified images according to aspects of the present disclosure.
Figure 8:
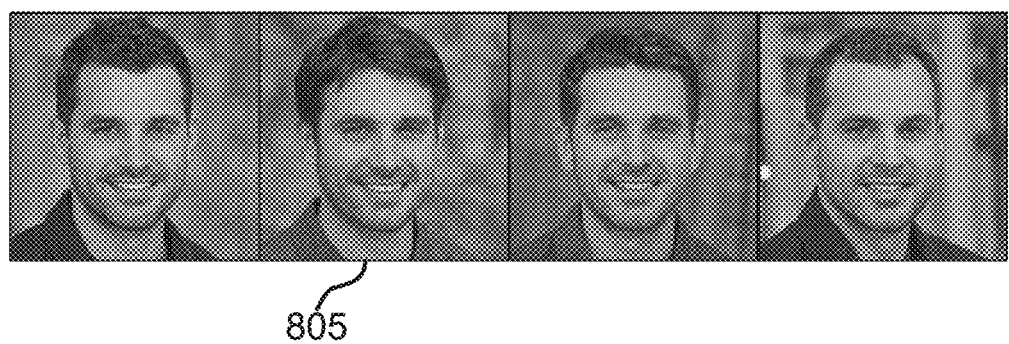

FIG. 8 shows an example of modified images according to aspects of the present disclosure. The example shown includes image depicting a face 800 and set of modified images 805. Referring to FIG. 8, image depicting a face 800 (e.g., facial image 800) has at least a first identity non-related attribute of short hair, a second identity non-related attribute of brown hair, and a third identity non-related attribute of short facial hair. An image generation network generates set of modified images 800 based on facial image 800 as described with reference to FIGS. 6 and 7. As shown in FIG. 8, each modified image of set of modified images 805 depicts a face that has the first to third identity non-related attributes of facial image 800, while also having one or more identity-related attributes that are omitted from facial image 800, such that each of the modified images appear to a typical observer to depict a different person from each other and from facial image 800.

Training

A method for facial image generation is described with reference to FIGS. 9-12. One or more aspects of the method include identifying an identity non-related attribute vector representing an identity non-related attribute of a face; identifying a latent vector for an image generation network; encoding the latent vector using an encoder of a mapping network to obtain an identity-related vector on an identity-related vector space; generating a modified latent vector based on the identity non-related attribute vector and the identity-related vector using a decoder of the mapping network; and updating parameters of the mapping network based on the identity non-related attribute vector, the latent vector, and the modified latent vector.

Some examples of the method further include generating an image based on the latent vector. Some examples further include encoding the image to obtain the identity non-related attribute vector. Some examples further include computing a reconstruction loss based on the latent vector and the modified latent vector, wherein the parameters of the mapping network are updated based on the reconstruction loss.

Some examples of the method further include generating an additional image based on an additional latent vector. Some examples further include encoding the additional image to obtain an additional identity non-related attribute vector. Some examples further include selecting an additional identity-related vector independent of the additional latent vector. Some examples further include generating an additional modified latent vector based on the identity-related vector, the additional identity-related vector, and the additional identity non-related attribute vector. Some examples further include computing an attribute loss based on the additional latent vector and the additional modified latent vector, wherein the parameters of the mapping network are updated based on the attribute loss.

Some examples of the method further include generating a plurality of additional identity-related vectors. Some examples further include computing a divergence loss based on the set of additional identity-related vectors, wherein the parameters of the mapping network are updated based on the divergence loss. In some aspects, the divergence loss causes the encoder to output a Gaussian distribution.

Some examples of the method further include identifying a plurality of latent vectors in a latent space. Some examples further include generating a plurality of images based on the plurality of latent vectors, respectively. Some examples further include identifying a plurality of data pairs, wherein each of the plurality of data pairs includes an image of the plurality of images and a corresponding latent vector from the plurality of latent vectors, wherein the latent vector is selected from a data pair of the plurality of data pairs.

Figure 9:
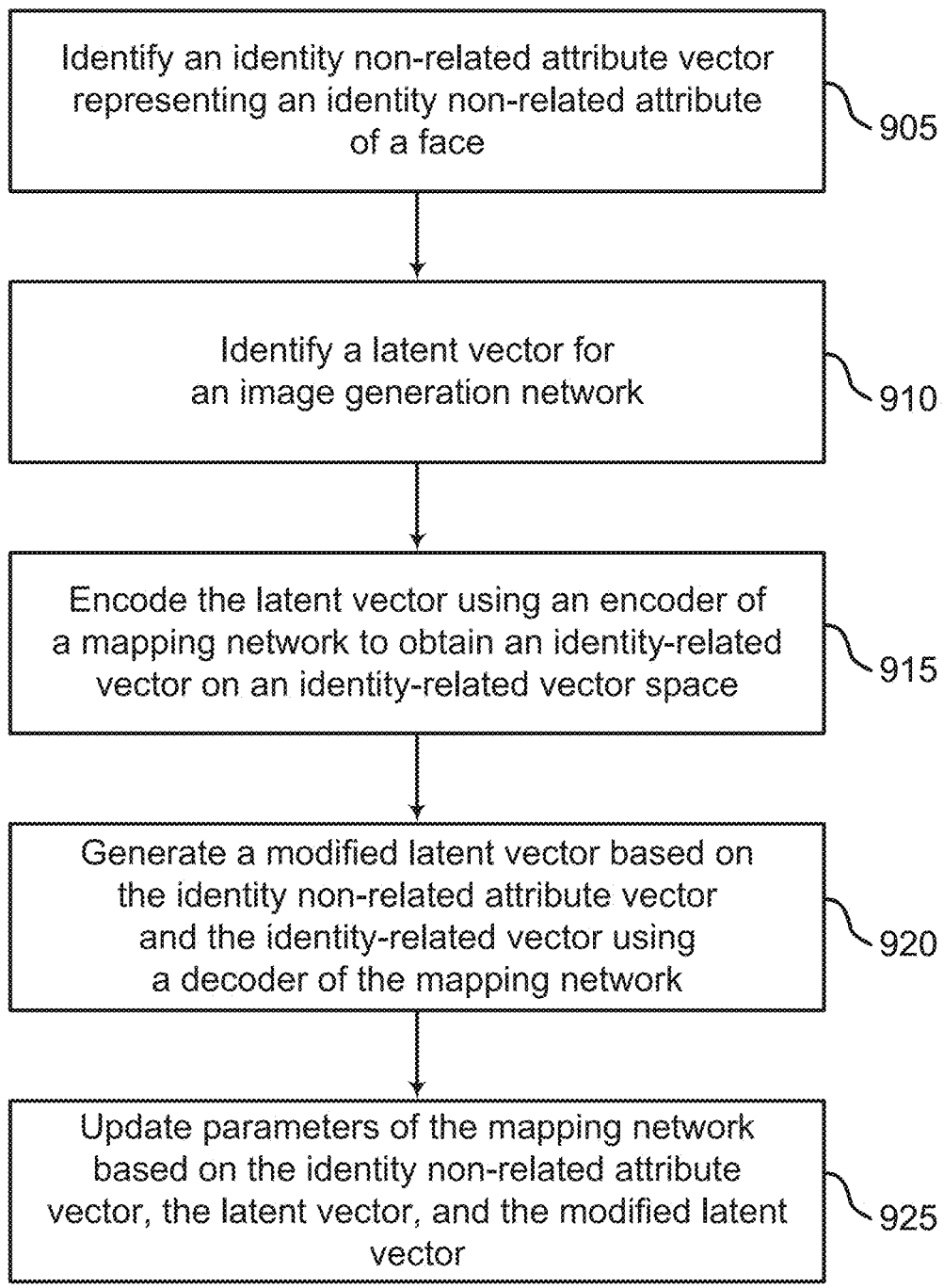
FIG. 9 shows an example of training a mapping network according to aspects of the present disclosure.

FIG. 9 shows an example of training a mapping network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies an identity non-related attribute vector representing an identity non-related attribute of a face. In some cases, the operations of this step refer to, or may be performed by, a mapping network as described with reference to FIGS. 2-4. According to some aspects, an attribute encoder as described with reference to FIGS. 2 and 3 encodes an image depicting a face to obtain the identity non-related attribute vector $f_q$ as described with reference to FIG. 10. In some embodiments, the attribute encoder provides the identity non-related attribute vector $f_q$ to the mapping network, and the mapping network identifies the identity non-related attribute vector $f_q$ in response to receiving the identity non-related attribute vector $f_q$.

At operation 910, the system identifies a latent vector for an image generation network. In some cases, the operations of this step refer to, or may be performed by, a selection component as described with reference to FIGS. 2-4. According to some aspects, a selection component as described with reference to FIG. 2 selects the latent vector $w_q$ as described with reference to FIG. 12. According to some aspects, the selection component retrieves the latent vector $w_q$ from a database as described with reference to FIG. 2. In some examples, the selection component provides the latent vector $w_q$ to the mapping network, and the mapping network identifies the latent vector $w_q$ in response to receiving the latent vector $w_q$.

At operation 915, the system encodes the latent vector using an encoder of a mapping network to obtain an identity-related vector on an identity-related vector space. In some cases, the operations of this step refer to, or may be performed by, a mapping network as described with reference to FIGS. 2-4. In an example, an encoder of the mapping network encodes the latent vector $w_q$ to obtain the identity-related vector $z_q$ on the identity-related vector space.

At operation 920, the system generates a modified latent vector based on the identity non-related attribute vector and the identity-related vector using a decoder of the mapping network. In some cases, the operations of this step refer to, or may be performed by, a mapping network as described with reference to FIGS. 2-4.

In some embodiments, the mapping network generates the modified latent vector $\hat{w}_q$ by reconstructing the latent vector $w_q$:

$$z_q = E(w_q)(\hat{w}q) = D(z_q f_q) \qquad (1)$$

where E is the encoder of the mapping network and D is the decoder of the mapping network.

At operation 925, the system updates parameters of the mapping network based on the identity non-related attribute vector, the latent vector, and the modified latent vector. In some cases, the operations of this step refer to, or may be performed by, a training component as described with reference to FIG. 2.

According to some aspects, the training component updates the parameters of the mapping network according to a reconstruction loss as described with reference to FIG. 10. According to some aspects, the training component updates the parameters of the mapping network according to an attribute loss as described with reference to FIG. 11.

According to some aspects, the training component updates the parameters of the mapping network using one or more losses derived from one or more loss functions. The term "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

According to some aspects, the training component updates the parameters of the mapping network according to a divergence loss. In an example, the selection component identifies a set of latent vectors as described with reference to FIG. 12 and provides the set of latent vectors to the mapping network. In response to receiving the set of latent vectors, the encoder of the mapping network generates a set of additional identity-related vectors z by encoding the set of latent vectors. A training component computes a divergence loss $L_{div}$ based on the set of additional identity-related vectors z:

$$L_{div} = -E_{z \sim q(z|w_q)}[\log p(w_q|z, f_q)] + KL(q(z|w_q) \| p(z)) \qquad (2)$$

where $E_{z \sim q(z|w_q)}$ is the encoder of the mapping network and $KL(q(z|w_q) \| p(z))$ is a Kullback-Leibler divergence that measures the difference between the identity-related vector space p(z), a Gaussian distribution of the set of additional identity-related vectors, and the probability distribution $q(z|w_q)$. According to some embodiments, the training component optimizes the weights of the encoder and the decoder of the mapping network according to the divergence loss $L_{div}$.

According to some aspects, the divergence loss $L_{div}$ causes the encoder to output a Gaussian distribution. In an example, the inclusion of the Kullback-Leibler divergence term $KL(q(z|w_q) \| p(z))$ in the divergence loss $L_{div}$ indicates a degree to which the set of additional latent vectors z approximates the Gaussian distribution of the identity-related vector space p(z), and the mapping network learns to output a set of identity-related vectors with a Gaussian distribution by iteratively minimizing the Kullback-Leibler divergence term $KL(q(z|w_q) \| p(z))$. By causing the encoder to output a Gaussian distribution, some embodiments of the present disclosure help the image generator to avoid a mode collapse, in which the image generator generates similar-looking images from only a single or a few modes of a distribution of an identity-related vector space based on an output vector from the mapping network.

According to some aspects, by updating the parameters of the mapping network based on the identity non-related attribute vector, the latent vector, and the modified latent vector, some embodiments of the present disclosure avoids the expense of collecting paired data, which is computationally expensive, and promotes an ability of the image generation network to generate multiple outputs based on the output of the mapping network. Furthermore, according to some aspects, by updating the parameters of the mapping network, rather than the image generation network, and using the image generation network to generate an image based on the output of the mapping network, some embodiments of the present disclosure avoid the longer training time and computational expense of training the more complex image generation network.

Figure 10:
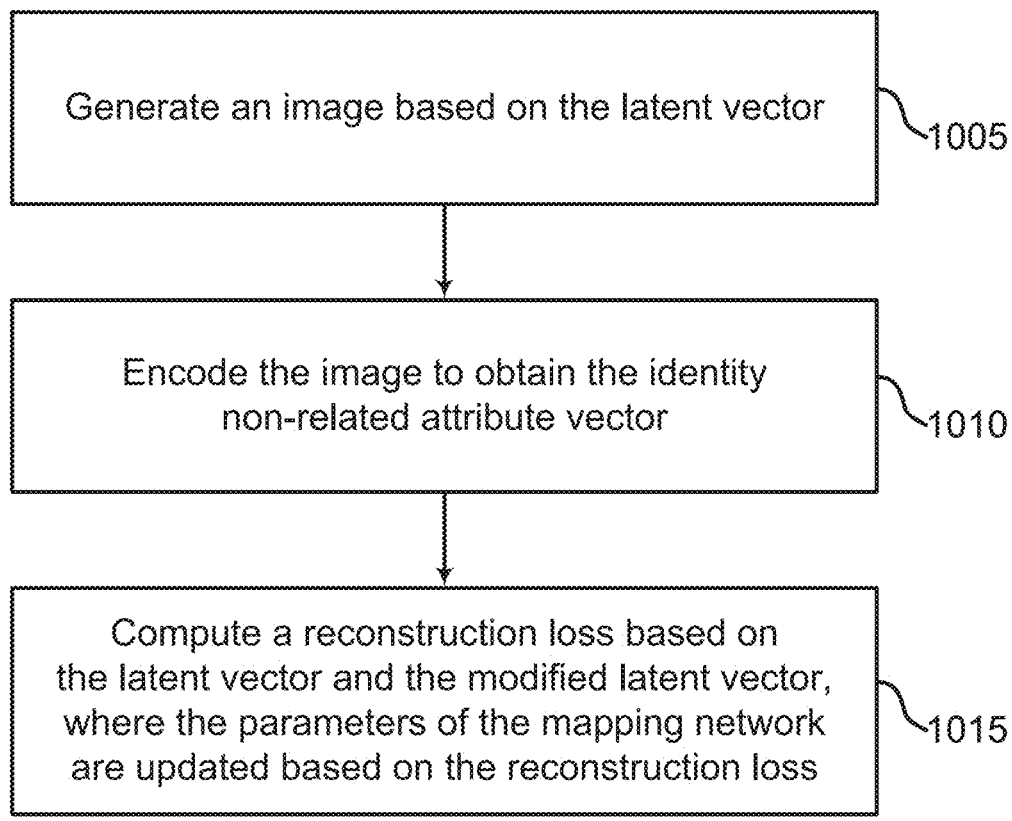
FIG. 10 shows an example of computing a reconstruction loss according to aspects of the present disclosure.

FIG. 10 shows an example of computing a reconstruction loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates an image based on the latent vector. In some cases, the operations of this step refer to, or may be performed by, an image generation network as described with reference to FIGS. 2 and 3. According to some aspects, the selection component provides the latent vector $w_q$ to the image generation network, and the image generation network decodes the latent vector $w_q$ to obtain the image in response to receiving the latent vector $w_q$. According to some aspects, the image depicts a human face.

At operation 1010, the system encodes the image to obtain the identity non-related attribute vector. In some cases, the operations of this step refer to, or may be performed by, an attribute encoder as described with reference to FIGS. 2 and 3. In an example, the image generation network provides the image to the attribute encoder, and the attribute encoder encodes the image using the multi-modal encoder of the attribute encoder to obtain the identity non-related attribute vector $f_q$.

At operation 1015, the system computes a reconstruction loss based on the latent vector and the modified latent vector, where the parameters of the mapping network are updated based on the reconstruction loss. In some cases, the operations of this step refer to, or may be performed by, a training component as described with reference to FIG. 2.

In an example, the training component computes the reconstruction loss according to a mean squared error loss function and updates the parameters of the mapping network such that the mean squared error (e.g., the reconstruction loss) between the latent vector $w_q$ and the modified latent vector $\hat{w}_q$ is minimized.

Figure 11:
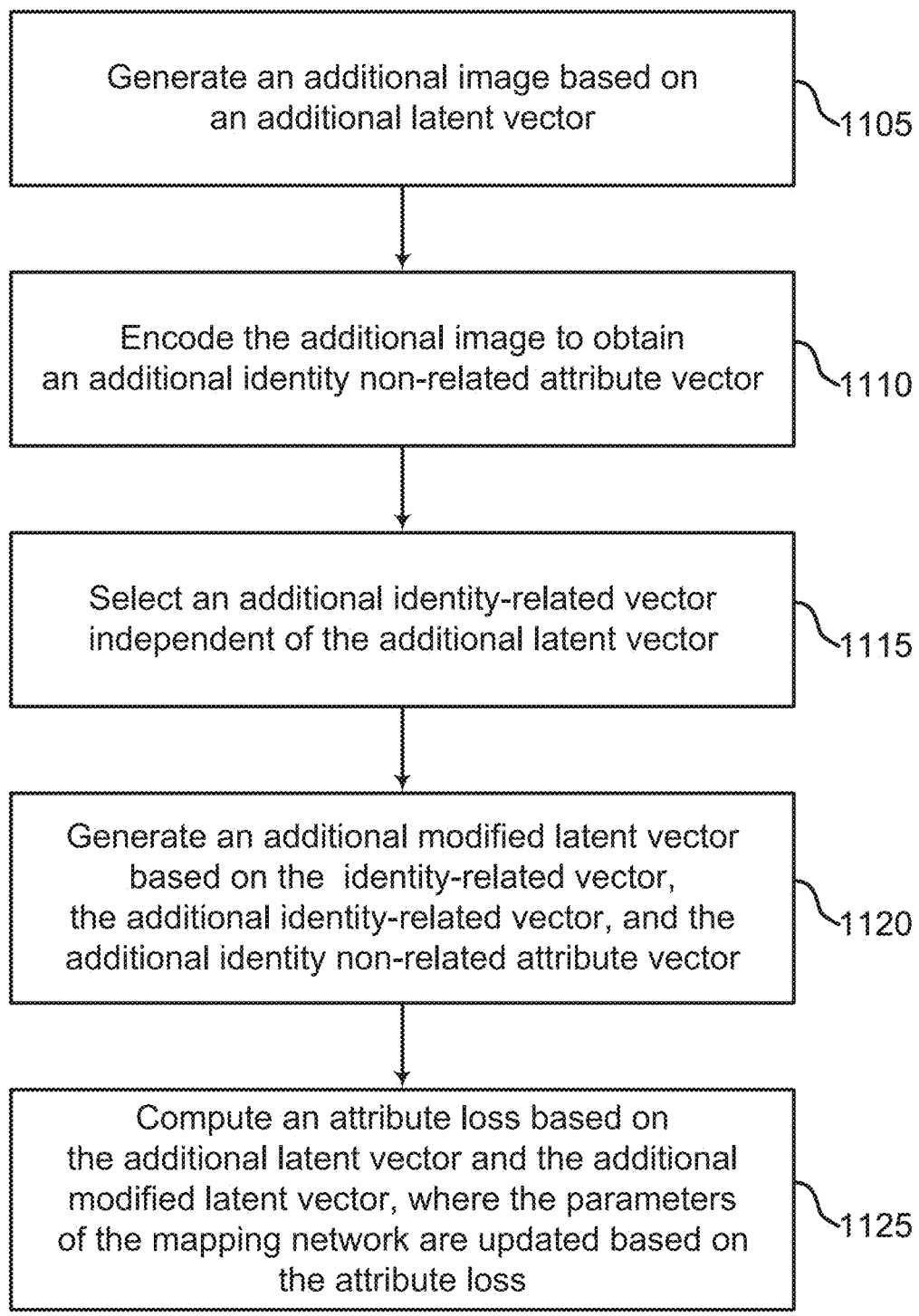
FIG. 11 shows an example of computing an attribute loss according to aspects of the present disclosure.

FIG. 11 shows an example of computing an attribute loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates an additional image based on an additional latent vector. In some cases, the operations of this step refer to, or may be performed by, an image generation network as described with reference to FIGS. 2 and 3. In an example, a selection component selects the additional latent vector $w_c$ from the set of latent vectors as described with reference to FIG. 12 and provides the additional latent vector $w_c$ to the image generation network. The image generation network generates the additional image by decoding the additional latent vector $w_c$ in response to receiving the additional latent vector $w_c$. In some embodiments, the additional image depicts a human face.

At operation 1110, the system encodes the additional image to obtain an additional identity non-related attribute vector. In some cases, the operations of this step refer to, or may be performed by, an attribute encoder as described with reference to FIGS. 2 and 3. In an example, the image generation network provides the additional image to the attribute encoder, and the attribute encoder encodes the additional image using a multi-modal encoder of the attribute encoder to obtain the additional identity non-related attribute vector $f_c$.

At operation 1115, the system selects an additional identity-related vector independent of the additional latent vector. In some cases, the operations of this step refer to, or may be performed by, a selection component as described with reference to FIGS. 2 and 3. According to some aspects, the mapping network encodes a set of latent vectors to obtain a set of identity-related vectors and stores the set of identity-related vectors in a database as described with reference to FIG. 2. In some embodiments, the selection component selects an additional identity-related vector that does not correspond to the additional latent vector from the set of identity-related vectors.

At operation 1120, the system generates an additional modified latent vector based on the identity-related vector, the additional identity-related vector, and the additional identity non-related attribute vector. In some cases, the operations of this step refer to, or may be performed by, a mapping network as described with reference to FIGS. 2-4. In an example, the selection component provides the additional identity-related vector to the mapping network, and the mapping network generates the additional modified latent vector $\hat{w}_c$ by decoding the additional identity-related vector and the additional identity non-related attribute vector $f_c$ using a decoder of the mapping network.

At operation 1125, the system computes an attribute loss based on the additional latent vector and the additional modified latent vector, where the parameters of the mapping network are updated based on the attribute loss. In some cases, the operations of this step refer to, or may be performed by, a training component as described with reference to FIG. 2.

In some embodiments, the training component computes the attribute loss $L_{att}$ by reconstructing the additional latent vector $w_c$ given the addition identity non-related attribute vector $f_c$ and the identity-related vector $z_q$ as well reconstructing the latent vector $w_q$ given the identity non-related attribute vector $f_q$ and the identity-related vector $z_q$:

$$L_{att} = -E_{z\sim q(z|w_q)}[\log p(w_q|z,f_q)] - E_{z\sim q(z|w_q)}[\log p(w_c|z, f_c)] + KL(q(z|w_q)\|p(z)) \quad (3)$$

According to some aspects, the attribute loss $L_{att}$ encourages disentanglement between the set of identity-related vectors z and the identity non-related attribute vector $f_q$, which may become entangled when the parameters of the mapping network are updated based on the divergence loss $L_{div}$ as described with reference to FIG. 9.

Figure 12:
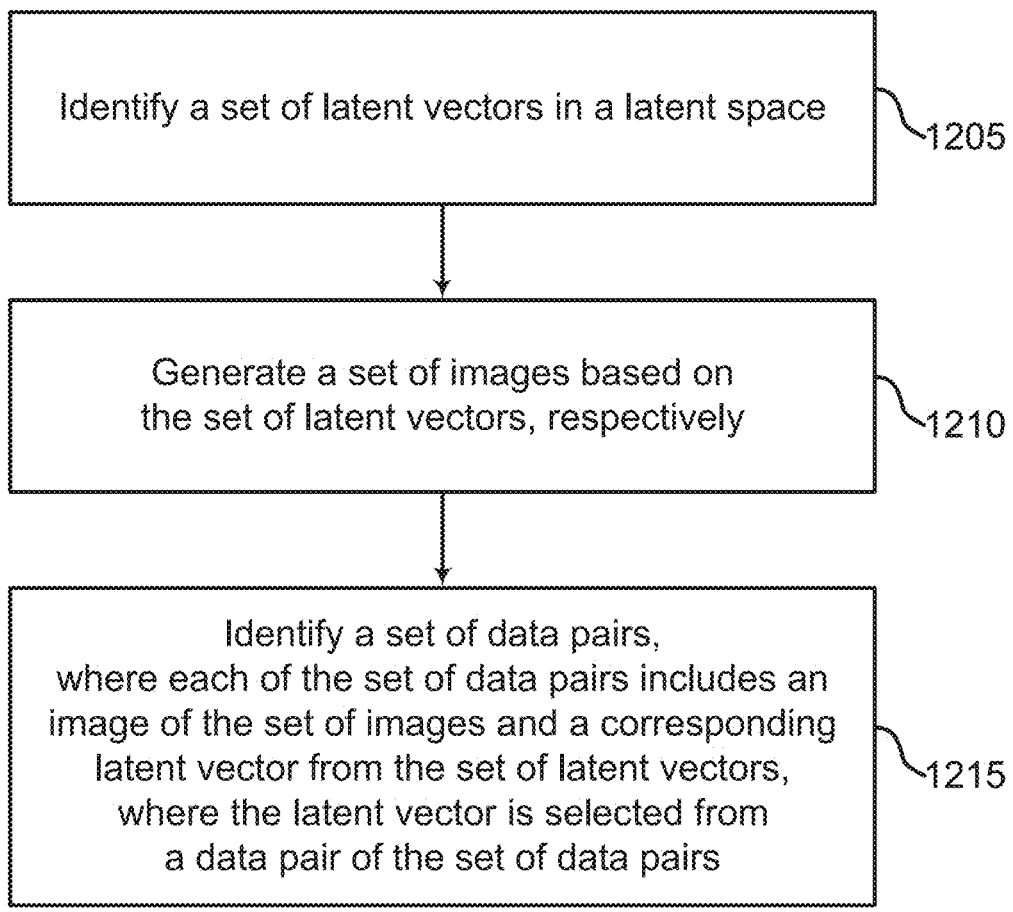
FIG. 12 shows an example of selecting a latent vector according to aspects of the present disclosure.

FIG. 12 shows an example of identifying a set of data pairs according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies a set of latent vectors in a latent space. In some cases, the operations of this step refer to, or may be performed by, an image generation network as described with reference to FIGS. 2 and 3. As used herein, a latent space is a set of values that may be included in latent vectors. In some embodiments, the selection component generates the set of latent vectors on the latent space. In some embodiments, the selection component retrieves the set of latent vectors from a database as described with reference to FIG. 2. According to some aspects, the selection component provides the set of latent vectors to the image generation network, and the image generation network identifies the set of latent vectors in response to receiving the set of latent vectors.

At operation 1210, the system generates a set of images based on the set of latent vectors, respectively. In some cases, the operations of this step refer to, or may be performed by, an image generation network as described with reference to FIGS. 2 and 3. In an example, the image generation network decodes the set of latent vectors to obtain the set of images.

At operation 1215, the system identifies a set of data pairs, where each of the set of data pairs includes an image of the set of images and a corresponding latent vector from the set of latent vectors, where the latent vector is selected from a data pair of the set of data pairs. In some cases, the operations of this step refer to, or may be performed by, a selection component as described with reference to FIG. 2. In some embodiments, the image generation network associates an image of the set of images with a corresponding latent vector of the set of latent vectors and records the association in a database as described with reference to FIG. 2. In some embodiments, the image generation network stores the set of images and the set of latent vectors in the database as the set of data pairs based on the association. In some embodiments, the selection component randomly selects a data pair of the set of data pairs from the database, and selects the latent vector $w_q$ from the selected data pair.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for facial image generation, comprising:
receiving an image depicting a face, wherein the face has an identity non-related attribute and a first identity-related attribute;
encoding, using an attribute encoder, the image to obtain an identity non-related attribute vector in an identity non-related attribute vector space, wherein the identity non-related attribute vector represents the identity non-related attribute;
receiving an identity-related vector, wherein the identity-related vector represents a second identity-related attribute different from the first identity-related attribute, and wherein the second identity-related attribute is independent of the image;
generating, using a mapping network of a machine learning model, a modified latent vector in a latent vector space based on the identity non-related attribute vector and the identity-related vector; and
generating, using an image generation network, a modified image based on the modified latent vector, wherein the modified image depicts a face that has the identity non-related attribute and the second identity-related attribute.

2. The method of claim 1, further comprising:
detecting a plurality of identity non-related attributes of the face to obtain a plurality of identity non-related attribute values representing the plurality of identity non-related attributes, respectively, wherein the identity non-related attribute vector includes the plurality of identity non-related attribute values.

3. The method of claim 1, wherein:
the image is encoded using a multi-modal encoder.

4. The method of claim 1, wherein:
the identity-related vector is selected randomly from the identity-related vector space.

5. The method of claim 1, further comprising:
concatenating the identity non-related attribute vector and the identity-related vector to obtain a combined input vector, wherein the modified latent vector is generated based on the combined input vector.

6. The method of claim 1, further comprising:
selecting a plurality of identity-related vectors from the identity-related vector space, wherein each of the plurality of identity-related vectors corresponds to a different identity-related attribute;
generating a plurality of modified latent vectors based on the plurality of identity-related vectors and the identity non-related attribute vector; and
generating a plurality of modified images based on the plurality of modified latent vectors.

7. The method of claim 1, further comprising:
identifying a latent vector representing the image;
providing the latent vector to a first block of an image generation network; and
providing the modified latent vector to a second block of the image generation network, wherein the modified image is generated based on the latent vector and the modified latent vector using the image generation network.

8. The method of claim 7, further comprising:
receiving a user input indicating a blending parameter; and
selecting the second block of the image generation network for providing the modified latent vector based on the blending parameter.

9. A method for facial image generation, comprising:
receiving an identity non-related attribute vector representing an identity non-related attribute of a face;
receiving a latent vector for an image generation network;
encoding the latent vector using an encoder of a mapping network of a machine learning model to obtain an identity-related vector on an identity-related vector space;
generating a modified latent vector based on the identity non-related attribute vector and the identity-related vector using a decoder of the mapping network; and
updating parameters of the mapping network based on the identity non-related attribute vector, the latent vector, and the modified latent vector.

10. The method of claim 9, further comprising:
generating, using an image generation network, an image based on the latent vector;
encoding, using an attribute encoder, the image to obtain the identity non-related attribute vector; and
computing a reconstruction loss based on the latent vector and the modified latent vector, wherein the parameters of the mapping network are updated based on the reconstruction loss.

11. The method of claim 9, further comprising:
generating an additional image based on an additional latent vector;
encoding the additional image to obtain an additional identity non-related attribute vector;
selecting an additional identity-related vector independent of the additional latent vector;
generating an additional modified latent vector based on the identity-related vector, the additional identity-related vector, and the additional identity non-related attribute vector; and
computing an attribute loss based on the additional latent vector and the additional modified latent vector, wherein the parameters of the mapping network are updated based on the attribute loss.

12. The method of claim 9, further comprising:
generating a plurality of additional identity-related vectors; and
computing a divergence loss based on the plurality of additional identity-related vectors, wherein the parameters of the mapping network are updated based on the divergence loss.

13. The method of claim 12, wherein:
the divergence loss causes the encoder to output a Gaussian distribution.

14. The method of claim 9, further comprising:
identifying a plurality of latent vectors in a latent space;
generating a plurality of images based on the plurality of latent vectors, respectively; and
identifying a plurality of data pairs, wherein each of the plurality of data pairs includes an image of the plurality of images and a corresponding latent vector from the plurality of latent vectors, wherein the latent vector is selected from a data pair of the plurality of data pairs.

15. An apparatus for facial image generation, comprising:
at least one processor;
at least one memory storing instructions executable by the at least one processor;
an attribute encoder configured to encode an image to obtain an identity non-related attribute vector in an identity non-related attribute vector space, wherein the identity non-related attribute vector represents an identity non-related attribute of the image;
a selection component configured to receive an identity-related vector, wherein the identity-related vector represents a second identity-related attribute different from a first identity-related attribute of the image, and wherein the second identity-related attribute is independent of the image;
a mapping network of a machine learning model, the mapping network configured to generate a modified latent vector in a latent vector space based on the identity non-related attribute vector and the identity-related vector; and
an image generation network configured to generate a modified image based on the modified latent vector.

16. The apparatus of claim 15, wherein:
the mapping network comprises an encoder that is trained to take vectors from the latent vector space and output a Gaussian distribution of vectors in the identity-related vector space.

17. The apparatus of claim 15, wherein:
the mapping network comprises a decoder configure to generate the modified latent vector.

18. The apparatus of claim 15, wherein:
the attribute encoder comprises a multi-modal encoder.

19. The apparatus of claim 15, wherein:
the image generation network comprises a generative adversarial network (GAN).

20. The apparatus of claim 15, further comprising:
a user interface configured to receive a blending input from a user, wherein the modified image is generated based on the blending input.

* * * * *